United States Patent [19]

Porret et al.

[11] 3,843,675
[45] Oct. 22, 1974

[54] N-HETEROCYCLIC POLYGLYCIDYL COMPOUNDS CONTAINING ESTER GROUPS

[75] Inventors: Daniel Porret, Binningen; Friedrich Stockinger, Basel, both of Switzerland

[73] Assignee: Ciba-Geigy Corporation, Ardsley, N.Y.

[22] Filed: Feb. 3, 1972

[21] Appl. No.: 223,356

[30] Foreign Application Priority Data
Feb. 24, 1971 Switzerland.................. 2657/71

[52] U.S. Cl. ......... 260/309.5, 260/2 EP, 260/2 EA, 260/2 EC, 260/2 N, 260/13, 260/18 EP, 260/30.4 EP, 260/30.6 R, 260/31.8 E, 260/37 EP, 260/78.4 EP, 260/256.4 C, 260/257, 260/260
[51] Int. Cl............................................ C07d 49/32
[58] Field of Search............................... 260/309.5

[56] References Cited
UNITED STATES PATENTS
3,391,097  7/1968  Williamson.................... 260/309.5

FOREIGN PATENTS OR APPLICATIONS
1,576,669  8/1969  France........................... 260/309.5
1,165,060  9/1969  Great Britain.................. 260/309.5

Primary Examiner—Natalie Trousof

[57] ABSTRACT

N-heterocyclic polyglycidyl compounds are obtained if the polyesters obtained from 1 mol of a n-valent aliphatic or cycloaliphatic polyol and $n$ mols of 3-(2'-carboxyethyl) or 3-(2'-methyl-2'-carboxyethyl) compounds of a N,N-heterocyclic substance, for example hydantoin, are glycidylated in accordance with known processes.

The new N-heterocyclic polyglycidyl compounds can be converted, with customary curing agents for epoxide resins, into mouldings and coatings having good mechanical and dielectric properties.

10 Claims, No Drawings

N-HETEROCYCLIC POLYGLYCIDYL COMPOUNDS CONTAINING ESTER GROUPS

The subject of the present invention are new N-heterocyclic polyglycidyl compounds of the formula

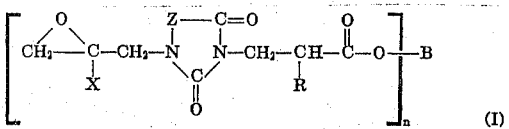

(I)

wherein X and R independently of one another each denote a hydrogen atom or the methyl group, Z represents a nitrogen-free divalent radical which is required to complete a five-membered or six-membered, unsubstituted or substituted hetero-cyclic ring, B denotes the radical obtained by removing the hydroxyl groups of a n-valent aliphatic, cycloaliphatic, cycloaliphatic-aliphatic, araliphatic or heterocyclic-aliphatic polyol, preferably diol, and n denotes a number from 2 to 4, preferably 2.

The radical Z in the formula (I) preferably consists only of carbon and hydrogen or of carbon, hydrogen and oxygen. It can be, for example, a radical of the formulae

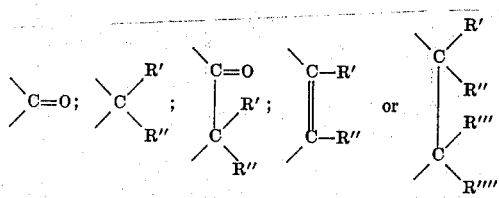

wherein R', R'', R''' and R'''' independently of one another each can denote a hydrogen atom or an alkyl, alkenyl or cycloalkyl group or an optionally substituted phenyl group and wherein, in the case that Z represents a divalent radical of the formula

R' and R'' together, with the inclusion of the C atom, can also denote a cyclic aliphatic hydrocarbon radical.

The new polyglycidyl compounds of the formula (I) are as a rule resins which are vicous to solid at room temperature and which can be converted, either as such or mixed with reactive diluents, by means of customary curing agents for epoxide resins, such as dicarboxylic acid anhydrides or polyamines, into mouldings having good mechanical and electrical properties.

The new polyepoxides of the formula (I) are manufactured according to methods which are in themselves known. A preferred process for their manufacture is characterised in that, in a compound of the formula

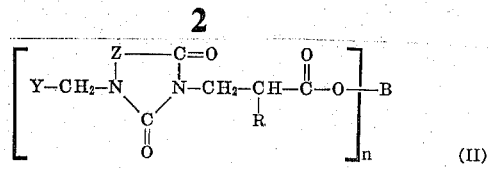

(II)

wherein R, Z, B and n have the same meaning as in the formula (I) and the radical Y is a radical which can be converted into the 1,2-epoxyethyl or 1-methyl-1,2-epoxyethyl group, this radical is converted into a 1,2-epoxyethyl or 1-methyl-1,2-epoxyethyl group.

A radical Y which can be converted into the 1,2-epoxyethyl or 1-methyl-1,2-epoxyethyl group is above all a hydroxyhalogenoethyl group which carries the functional groups on different carbon atoms, especially a 2-halogeno-1-hydroxyethyl group or a 2-halogeno-1-hydroxy-1-methylethyl group. Halogen atoms are here especially chlorine atoms or bromine atoms. The reaction takes place in the usual manner, above all in the presence of agents which split off hydrogen halide, such as strong alkalis, for example anhydrous sodium hydroxide or aqueous sodium hydroxide solution. It is, however, also possible to use other strongly alkaline reagents, such as potassium hydroxide, barium hydroxide, calcium hydroxide, sodium carbonate or potassium carbonate.

A further radical Y which can be converted into the 1,2-epoxyethyl group is, for example, the ethenyl group, which can be converted into the 1,2-epoxyethyl group in a known manner, such as, above all, by reaction with hydrogen peroxide or per-acids, for example peracetic acid, perbenzoic acid or monoperphthalic acid.

The starting substances of the formula (II) are obtained in a manner which is in itself known. Thus it is possible, for example, to react a diester, triester or tetraester of the formula

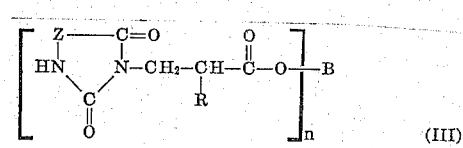

(III)

wherein R, B and n have the abovementioned meaning, with a compound of the formula Y-CH₂-Hal, wherein Hal represents a halogen atom and Y has the abovementioned meaning. Preferably, the compound of the formula (III) is reacted with an epihalogenohydrin or β-methylepihalogenohydrin, above all epichlorohydrin or β-methylepichlorohydrin, in the presence of a catalyst, such as, especially, a tertiary amine, a quaternary ammonium base or a quaternary ammonium salt. Suitable catalysts for the addition of epichlorohydrin or β-methylepichlorohydrin are above tertiary amines, such as triethylamine, tri-n-propylamine, benzyldimethylamine, N,N'-dimethylaniline and triethanolamine; quaternary ammonium bases,, such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; hydrazines possessing a tertiary nitrogen atom, such as 1,1-dimethylhydrazine, which can also be employed in a quaternised from; alkali halides, such as lithium chloride, potassium chloride and sodium chloride, bromide or fluoride, and also ion exchange resins with tertiary or quaternary amino groups, as well as ion exchangers with acid amide groups. Basic impurities which may occur in technical commercially available forms of the starting compounds can also act as catalysts. In such cases it is not necessary to add a special catalyst.

The intermediate products of the formula (II) and the end products of the formula (III) are appropriately manufactured in a two-stage process without isolating the intermediate products (II).

A preferred embodiment of the process is, for example, to react an epihalogenohydrin or β-methylepihalogenohydrin, preferably epichlorohydrin or β-methylepichlorohydrin, in the presence of a catalyst, such as, preferably, a tertiary amine, a quaternary ammonium base or a quaternary ammonium salt, with a polyester of the formula (III) and, in a second stage, to treat the resulting product, containing halogenohydrin groups, with agents which split off hydrogen halide. In these reactions, the procedure described above is followed, and the compounds mentioned above can be used as catalysts for the addition of epihalogenohydrin or β-methylepihalogenohydrin or for the dehydrohalogenation. Particularly good yields are obtained if an excess of epichlorohydrin or β-methylepichlorohydrin is used. During the first reaction, before the addition of alkali, a partial epoxidation or dichlorohydrin or of the dichloro-β-methylhydrin of the diester, triester or tetraester (III) already occurs. The epichlorohydrin or the β-methylepichlorohydrin, which act as hydrogen chloride acceptors, have in that case been partially converted into glycerine dichlorohydrin or into β-methylglycerine dichlorohydrin.

The polyesters of the formula (III) can be manufactured according to known methods, by reacting n mols of a monocarboxylic acid of the formula

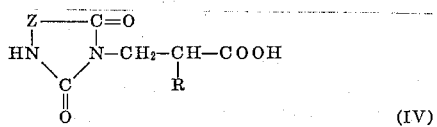

(IV)

wherein R and Z have the same meaning as in the formula (I), with 1 mol of a polyalcohol of the formula

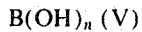

wherein B and $n$ have the same meaning as in the formula (I). Of course, it is also possible to react a mixture of different monocarboxylic acids of the formula (IV) with a polyalcohol of the formula (V).

Possible polyalcohols of the formula (V) are above all of those of the aliphatic, cycloaliphatic and heterocyclic-aliphatic series.

As dialcohols of the aliphatic series there may be mentioned: ethylene glycol, 1,2-propanediol, 1,3-propanediol, 1,4-butanediol, 1,5-pentanediol, neopentyl glycol, 1,6-hexanediol, 1,7-heptanediol, 1,8-octanediol, 1,9-nonanediol, 1,10-decanediol, 1,11-undecanediol, 1,12-dodecanediol, 1,6-dihydroxy-2,2,4-trimethyl-hexane, 1,6-dihydroxy-2,4,4-trimethyl-hexane, 1,4-butendiol; polyester glycols, such as diethylene glycol, triethylene glycol, tetraethylene glycol, dipropylene glycol, polyethylene glycols and polypropylene glycols of average molecular weight 250 to 2,500, polybutylene glycols and polyhexanediols; hydroxypolyesters, such as hydroxypivalic acid neopentylglycol diester.

As dialcohols of the cycloaliphatic series there may be mentioned: 1,1-, 1,2-, 1,3- and 1,4-bis(hydroxymethyl) cyclohexane and the corresponding unsaturated cyclohexene derivatives, such as, for example, 1,-1-bis(hydroxymethyl)-cyclohexene-3 and 1,1-bis(hydroxymethyl)-2,5-methylene -cyclohexene-3; hydrogenated diphenols, such as cis-quinitol, transquinitol, resorcitol, 1,2-dihydroxycyclohexane, bis-(4-hydroxy-cyclohexyl)-methane, 2,-2-bis-(4'-hydroxyclyclohexyl)-propane; tricyclo-(5,2,1,0$^{2,6}$)-decane-3,9- or -4,8-diol and adducts of glycols to diallylidene-pentaerythritol, for example 3,9-bis-(hydroxyethoxyethyl)-spirobi-(metadioxane).

Possible dialcohols of the heterocyclic-aliphatic series are especially the addition products of at least 2 mols of an alkylene oxide, such as ethylene oxide, propene oxide, 1,2-butene oxide or styrene oxide, to 1 mol of a mononuclear or polynuclear N-heterocyclic compound possessing two ring NH groups, such as, above all, hydantoin and its derivatives, dihydrouracil and its derivatives, barbituric acid and its derivatives bishydantoins and bis-dihydrouracils. The following may be mentioned: 1,3-di-(β-hydroxyethyl)-5,5-dimethylhydantoin, 1,3-di-(β-hydroxyethyl)-5-phenyl-5-ethylbarbituric acid, 1,3-di-(β-hydroxy-n-propyl)-5,5-dimethylhydantoin, 1,3-di-(β-hydroxy-n-propyl)-5,5-diethylbarbituric acid, 1,3-di-(β-hydroxyethoxyethoxyethyl)-5,5dimethylhydantoin, 1,-3-di-(β-hydroxy-n-propyl)-5-isopropylhydantoin, 1,3-di-(β-hydroxy-n-propyl)-5,5-diethylhydantoin, 1,3-di-(β-hydroxy-n-propyl)-5-ethyl-5-methylhydantoin, 1,3-di(β-hydroxyethyl)-5,5-dimethyl-6-isopropyl-5,6-dihydrouracil, 1,3-di-(β-hydroxy-n-propyl)-5,5-dimethyl-6-isopropyl-5,6-dihydrouracil, 1,3-di-(2'-hydroxy-n-butyl)-5,5-dimethylhydantoin, 1,3-di-(β-hydroxy-β-phenylethyl)-5,5-dimethyl-hydantoin, 1,3-di-(β-hydroxy-β-phenylethyl)-6-methyluracil, 1,3-di(β-hydroxy-β-phenylethyl)-5,5-dimethyl-6-isopropyl-5,6-dihydrouracil, 1,3-di-(β-hydroxy-β-phenylethoxy-β-phenylethoxy-β-phenylethyl)-5,5-dimethylhydantoin, 1,3-di-(β-hydroxy-β-phenylethyl)-5-isopropylhydantoin, 1,3-di-(β-hydroxy-β-phenylethyl)-5-ethyl-5-phenylbarbituric acid, 1,1'-methylene-bis-(3-β-hydroxyethyl-5,5 -dimethylhydantoin),1,1'-methylene-bis(3-β-hydroxyethyoxyethoxyethyl-5,5-dimethylhydantoin), 1,1'-methylene-bis-(3-β-hydroxy-n-propyl-5,5-dimethylhydantoin), 1,1'-methylene -bis-(3-β-hydroxyethyl-5,5-dimethyl-5,6-dihydrouracil), 1,4-bis-(1'-hydroxyethyl-5',5'-dimethylhydantoin-3')-butane, 1,6-bis-(1'β'-hydroxyethyl-5',5'-dimethylhydantoinyl-3')-hexane, 1,6-bis-(1'-β'-hydroxy-n-propyl-5',5'-dimethylhydantoinyl-3')-hexane, 1,1'-methylene-bis-(3-β-hydroxypropyl-5-isopropylhydantoin), 1,1'-methylene-bis-(3β-hydroxy-n-propyl-5,5-dimethyl-5,6-dihydrouracil), 1,1'-methylene-bis-(3-[2''-hydroxy-n-butyl]-5,5-dimethylhydantoin), 1,6-bis-(1'-[2''-hydroxy-n-butyl]-5',5'-dimethylhydantoinyl-3')-hexane, G2s,β'-bis-(1-[2'-hydroxy-n-butyl]-5,5-dimethylhydantoinyl-3)-di-ethyl-ether and 1,1'-methyl-bis-(3-[β-hydroxy-β-phenylethyl])-5,5-dimethylhydantoin.

Examples of possible triols or tetrols of the formula B(OH)$_n$ are: glycerine, butane-1,2,4-triol, hexane-1,2,6-triol, 2,4-dihydroxy-3-hydroxymethylpentane, 1,1,1-trihydroxymethylethane, 1,1,1-trihydroxymethylpropane, pentaerythritol, erythritol and the addition products of ethylene oxide or propylene oxide to one of the above polyols.

The monocarboxylic acids of the general formula (IV) are obtained in a known manner by adding 1 mol of acrylonitrile to 1 mol of a mononuclear N-heterocyclic compound of the general formula

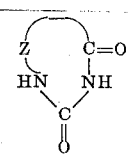

(VI)

wherein Z has the same meaning as in the formula (I), and hydrolysing the mono-(β-cyanoethyl) derivatives, obtained by cyanoethylation, to give the monocarboxylic acid; this takes place easily and with good yield. The monocarboxylic acids of the formula (IV) are normally solids which can be purified by recrystallisation.

The mononuclear N-heterocyclic compounds of the formula (V) used for the manufacture of the monocarboxylic acids of the formula (IV) are above all hydantoin, hydantoin derivatives, barbituric acid, barbituric acid derivatives, uracil, uracil derivaties, dihydrouracil and dihydrouracil derivatives, and also parabanic acid.

Hydantoin and its preferred derivatives correspond to the general formula

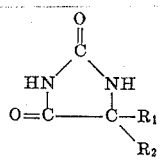

(VII)

wherein $R_1$ and $R_2$ each denote a hydrogen atom or a lower alkyl radical with one to four carbon atoms, or wherein $R_1$ and $R_2$ together form a tetramethylene or pentamethylene radical. Hydantoin, 5-methylhydantoin, 5-methyl-5-ethylhydantoin, 5-n-propylhydantoin, 5-isopropyl-hydantoin, 1,3-diaza-spiro-(4.5)-decane-2,4-dione, 1,3-diaza-spiro-(4.4)-nonane-2,4-dione and preferably 5,5-dimethyl-hydantoin may be mentioned.

Barbituric acid and its preferred derivatives correspond to the general formula

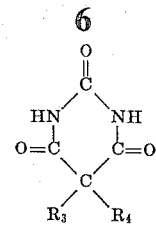

(VIII)

wherein $R_3$ and $R_4$ independently of one another each denote a hydrogen atom, an alkyl radical, an alkenyl radical, a cycloalkyl or cycloalkenyl radical or a substituted or unsubstituted phenyl radical.

The following may be mentioned: barbituric acid, 5-ethylbarbituric acid, 5,5-diethylbarbituric acid, 5-ethyl-5-butylbarbituric acid, 5-ethyl-5-sec.-butylbarbituric acid, 5-ethyl-5-isopentylbarbituric acid, 5,5-diallylbarbituric acid, 5-allyl-5-isopropylbarbituric acid, 5-diallylbarbituric acid, 5-allyl-5-isopropylbarbituric acid, 5-allyl-5-sec.-butylbarbituric acid, 5-ethyl-5-(1'-methylbutyl)-barbituric acid, 5-allyl-5-(1'-methylbutyl)barbituric acid, 5-ethyl-5-phenyl-barbituric acid and 5-ethyl-5-(1'-cyclohexen-1-yl)-barbituric acid.

Uracil and its preferred derivatives correspond to the general formula

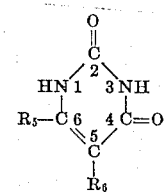

(IX)

wherein $R_5$ and $R_6$ both denote hydrogen or one of the two radicals denotes a hydrogen atom and the other radical denotes a methyl group.

Uracils of the formula (IX) are uracil itself and also 6-methyl-uracil and thymin (=5-methyl-uracil).

Dihydrouracil (=2,4-dioxo-hexahydropyrimidine) and its preferred derivatives correspond to the general formula:

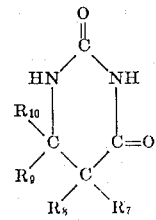

(X)

wherein $R_7$ and $R_8$ both denote a hydrogen atom or identical or different alkyl radicals, preferably alkyl radicals with one to four carbon atoms, and $R_9$ and $R_{10}$ independently of one another each denote a hydrogen atom or an alkyl radical.

Preferably, in the above formula, the two radicals $R_7$ and $R_8$ denote methyl groups, $R_9$ denotes a hydrogen atom or a lower alkyl radical with one to four carbon atoms and $R_{10}$ denotes a hydrogen atom. The following may be mentioned: 5,6-dihydrouracil, 5,5-dimethyl-5,6-dihydrouracil (2,4-dioxo-5,5-dimethylhexahydropyrimidine) and 5,5-dimethyl-6-isopropyl-5,6- dihydrouracil (2,4-dioxo-5,5-dimethyl-6-isopropylhexahydropyrimidine).

The new polyglycidyl compounds according to the invention, of the formula (I), react with the customary curing agents for polyepoxide compounds and can therefore be crosslinked or cured by addition of such curing agents, analogously to other polyfunctional epoxide compounds or epoxide resins. Possible curing agents of this nature are basic or acid compounds.

As examples of suitable curing agents there may be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis-(4-amino-3-methyl-cyclohexyl)-methane, 3,5,-5-trimethyl-3-(aminomethyl)-cyclohexylamine ("isophoronediamine"), Mannich bases, such as 2,4,6-tris-(dimethylaminomethyl)-phenol, m-phenylenediamine, p-phenylenediamine, bis-(4-aminophenyl)-methane, bis-(4-aminophenyl)-sulphone and m-xylylenediamine; N-(2-aminoethyl)-piperazine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine in excess, and polyepoxides, such as diomethanepolyglycidyl-ethers; ketimines, for example from acetone or methyl ethyl ketone and bis(p-amino-phenyl)-methane; adducts of monophenols or polyphenols and polyamines; polyamides, especially those from aliphatic polyamines, such as diethylenetriamine or triethylenetetramine, and dimerised or trimerised unsaturated fatty acids, such as dimerised linseed oil fatty acid ("VERSAMID"); polymeric polysulphides ("THIOKOL"); dicyandiamide, aniline-formaldehyde resins, polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$tetrahydrophthalic anhydride (= methylnadic anhydride), 3,4,5,6,7,7-hexachloro-3,6-endomethylene-$\Delta^4$-tetrahydrophthalic anhydride, succinic anhydride, adipic anhydride, azelaic anhydride, sebacic anhydride, maleic anhydride, dodecenyl-succinic anhydride; pyromellitic dianhydride or mixtures of such anhydrides.

Curing accelerators can furthermore be employed in the curing reaction; when using polyamides, dicyandiamide, polymeric polysulphides or polycarboxylic acid anhydrides as curing agents, suitable accelerators are, for example, tertiary amines, their salts or quaternary ammonium compounds, for example 2,4,6-tris-(dimethylaminomethyl)-phenol, benzyldimethylamine, 2-ethyl-4-methyl-imidazole, 4-amino-pyridine and triamylammonium phenolate, and also alkali metal alcoholates, such as, for example, sodium hexanetriolate. In this amine curing reaction, monophenols or polyphenols, such as phenol and diomethane, salicylic acid or thiocyanates, can for example be employed as accelerators.

The term "curing" as used here denotes the conversion of the abovementioned diepoxides into insoluble and infusible, crosslinked products, and in particular, as a rule, with simultaneous shaping to give mouldings, such as castings, pressings or laminates and the like, or to give "sheet-like structures," such as coatings, coverings, lacquer films or adhesive bonds.

Depending on the choice of the curing agent, the curing reaction can be carried out at room temperature, (18°–25° C) or at elevated temperature (for example, 50°–180° C).

The curing can, if desired, also be carried out in 2 stages, by first prematurely stopping the curing reaction or carrying out the first stage at only moderately elevated temperature, whereby a still fusible and soluble, curable precondensate (a so-called "B-stage") is obtained from the epoxide component and the curing agent component. Such a precondensate can, for example, be used for the manufacture of "Prepregs," compression moulding compositions or sintering powders.

The new polyglycidyl compounds can also be used as mixtures with other curable diepoxide or polyepoxide compounds. As examples of such, there may be mentioned: polyglycidyl ethers of polyhydric alcohols, such as 1,4-butanediol, $\Delta^3$-cyclohexenedimethanol, polyethylene glycols, polypropylene glycols, 1,3-di-(2'-hydroxy-n-propyl)-5,5-dimethylhydantoin or 2,2-bis-(4'-hydroxycyclohexyl)-propane; polyglycidyl ethers of polyhydric phenols, such as 2,2-bis-(4'-hydroxyphenyl)-propane (=diomethane), 2,2-bis-(4'-hydroxy-3',5'-dibromophenyl)-propane, bis-(4-hydroxyphenyl)-sulphone, 1,1,2,2-tetrakis-(4-hydroxyphenyl)-ethane or condensation products, manufactured in an acid medium, of formaldehyde with phenols, such as phenol-novolacs or cresol-novolacs; polyglycidyl esters of polycarboxylic acids, such as, for example, phthalic acid diglycidyl ester, isophthalic acid diglycidyl ester, tetrahydrophthalic acid diglycidyl ester or hexahydrophthalic acid diglycidyl ester; triglycidylisocyanurate, N,N'-diglycidyl-5,5-dimethylhydantoin, 1-glycidyl-3-(2'-glycidyloxy-n-propyl)-5,5-dimethylhydantoin, aminopolyepoxides such are obtained by dehydrohalogenation of the reaction products of epihalogenohydrin and primary or secondary amines, such as aniline or 4,4'-diaminodiphenylmethane, and also alicyclic compounds containing several epoxide groups, such as vinylcyclohexene diepoxide, dicyclopentadiene diepoxide, ethylene glycol-bis-(3,4-epoxytetrahydrodicyclopentadien-8-yl)-ether, (3',4'-epoxycyclohexylmethyl)-3,4-epoxycyclohexanecarboxylate, (3',4'-epoxy-6'-methylcyclohexylmethyl)-3,4-epoxy-6-methylcyclohexanecarboxylate, bis-(2,3-epoxycyclopentyl)-ether or 3-(3',4'-epoxycyclohexyl)-2,4-dioxa-spiro-(5,5)-9,10-epoxyundecane. If desired, known reactive diluents, such as, for example, styrene oxide, butyl glycidyl ether, diglycidylformal, isooctyl glycidyl ether, phenyl glycidyl ether, cresyl glycidyl ether, and glycidyl esters of synthetic, highly branched, mainly tertiary aliphatic monocarboxylic acids ("CARDURA E") can also be used conjointly.

A further subject of the present invention are therefore curable mixtures which are suitable for the manufacture of mouldings, including sheet-like structures, and which contain the polyglycidyl compounds according to the invention, of the formula (I), optionally together with other di- or polyepoxide compounds and also curing agents for epoxide resins, such as polyamines or polycarboxylic acid anhydrides.

The polyepoxides according to the invention or their mixtures with other polyepoxide compounds and/or curing agents can furthermore be mixed, in any stage before curing, with customary modifiers, such as extenders, fillers and reinforcing agents, pigments, dyestuffs, organic solvents, plasticisers, flow control agents, agents for conferring thixotropy, flameproofing substances and mould release agents.

As extenders, reinforcing agents, fillers and pigments which can be employed in the curable mixtures according to the invention there may, for example, be mentioned: coal tar, bitumen, textile fibres, glass fibres, asbestos fibres, boron fibres, carbon fibres, cellulose, polyethylene powder and polypropylene powder; quartz powder; mineral silicates, such as mica, asbestos powder and slate powder; kaolin, aluminum oxide trihydrate, chalk powder, gypsum, antimony trioxide, bentones, silica aerogel ("AEROSIL"), lithopone; baryte, titanium dioxide, carbon black, graphite, oxide pigments, such as iron oxide, or metal powders, such as aluminum powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

As plasticisers for modifying the curable mixtures, dibutyl phthalate, dioctyl phthalate and dinonyl phthalate, tricresyl phosphate, trixylenyl phosphate and also polypropylene glycol can, for example, be employed.

As flow control agents when employing the curable mixtures, especially in surface protection, silicones, cellulose acetobutyrate, polyvinylbutyral, waxes, stearates and the like (which in part are also used as mould release agents) may, for example, be added.

Particularly for use in the lacquer field, the diepoxide compounds can furthermore be partially esterified in a known manner with carboxylic acids such as, in particular, higher unsaturated fatty acids. It is furthermore possible to add other curable synthetic resin, for example phenoplasts or aminoplasts, to such lacquer resin formulations.

The curable mixtures according to the invention can be manufactured in the usual manner, with the aid of known mixing equipment (stirrers, kneaders, rolls and the like).

The curable epoxide resin mixtures according to the invention are above all employed in the fields of surface protection, the electrical industry, laminating processes and the building industry. They can be used in a formulation suited in each case to the special end use, in the unfilled or filled state, optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and filling compositions, floor covering compositions and binders for mineral aggregates.

In the examples which follow, unless otherwise stated, parts denote parts by weight and percentages denote percentages by weight. The relationship of parts by volume to parts by weight is as of the millilitre to the gram.

In order to determine the mechanical and electrical properties of the curable mixtures described in the examples which follow, sheets of size 92 × 41 × 12 mm were manufactured for determining the flexural strength, deflection, impact strength and water absorption. The test specimens, (60 × 10 × 4 mm) for determining the water absorption and for the flexural test and impact test (VSM 77,103 and VSM 77,105 respectively) were machined from the sheets.

For determining the heat distortion point according to Martens (DIN 53,458), test specimens of size 120 × 15 × 10 mm were cast in each case.

To test the arcing resistance and tracking resistance (VDE 0303), sheets of size 120 × 120 × 4 mm were cast.

A. Manufacture of the Diesters

Example A: Diester from 1 mol of 1,4-butanediol and 2 mols of 3-(2'-carboxyethyl)-5,5-dimethylhydantoin.

A mixture of 200.2g of 3-(2'-carboxyethyl)-5,5-dimethylhydantoin (1.0 45 g of 1,4-butanediol (0.5 mol), 3 g of p-toluenesulphonic acid and 400 ml of chloroform is subjected to an azeotropic circulatory distillation at a bath temperature of 130°–134° C. At 62° C internal temperature, the mixture begins to boil and the distillation starts. After 3 hours, a further 1.0 g of p-toluenesulphonic acid is added. After 20 hours, 12.8 ml of water have been separated off, and 1 g of p-toluenesulphonic acid is again added. The reaction temperature rises to 67° C. After a further 24 hours, the elimination of water, and hence the reaction, are complete; 18 ml (corresponding to 100 percent of theory) are obtained.

The reaction product is cooled to room temperature and extracted by shaking with 150 ml of 5 percent strength sodium bicarbonate solution and subsequently twice more with 50 ml of water at a time.

The organic phase is separated off and dried over anhydrous magnesium sulphate. After filtration, the solution is concentrated to dryness on a rotary evaporator at 40° to 50° C and under a slight waterpump vacuum. Thereafter, the last easily volatile constituents are removed by treating the reaction product under 0.2 mm Hg at 90° C until it reaches constant weight.

216.5 g (corresponding to 95.2 percent of theory) of a clear, viscous yellow resin are obtained, wherein the content of free carboxyl groups (originating from unreacted 3-carboxyethyl-dimethylhydantoin) is less than 0.03 equivalent/kg.

Elementary analysis shows the following:

| | %C | %H | %O |
|---|---|---|---|
| Found: | 52.8 | 6.8 | 28.6 |
| Calculated: | 52.85 | 6.65 | 28.2 |

Accordingly, the new bis-hydantoin compound has the following structure:

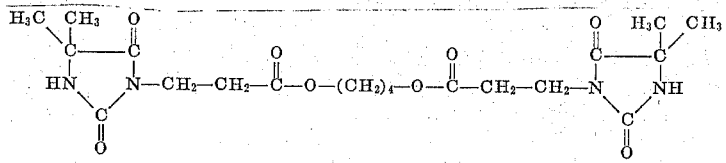

Example B: Diester of 1 mol of 1,6-hexanediol and 2 mols of 3-(2'-carboxyethyl)-5,5-dimethylhydantoin 300.3 g of 3-(2'-carboxyethyl)-5,5-dimethylhydantoin (1.5 mols) and 88.7 g of 1,6-hexanediol in 400 ml of toluene, and in the pressure of 6 g of p-toluenesulphonic acid as the catalyst, are reacted analogously to Example A. The bath temperature for the reaction is 160° C. The reaction temperature rises from 102° to 113° C. The reaction is complete in 10 hours. The amount of water to be extracted theoretically (27 ml) is separated off. The reaction mixture is worked up analogously to Example A and 332.3 g (91.8 percent of theory) of a light yellow melt, which gradually crystallises throughout, are obtained. The crude product thus obtained melts at 110°–116° C. The content of carboxyl groups is less than 0.04 equivalent/kg.

Elementary analysis shows the following:

Found: 54.9% C 7.1% H 11.3% N
Calculated: 54.8% C 7.1% H 11.6% N

The new substance obtained accordingly corresponds to the following structure:

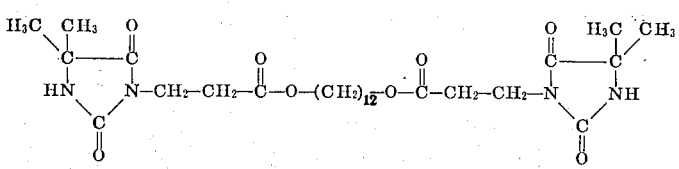

Example C: Diester from 1 mol of 1,12-dodecanediol and 2 mols of 3-(2'-carboxyethyl)-5,5-dimethylhydantoin.

A mixture of 200.2 g of 3-(2'-carboxyethyl)-5,5-dimethylhydantoin (1.0 mol) and 101.1 g of 1,12-dodecanediol (0.5 mol) in 300 ml of toluene is reacted with 4.0 g of p-toluenesulphonic acid as the catalyst, analogously to Example A. The reaction is carried out at 170° C bath temperature and is complete within 13 hours, as can be seen from the theoretical amount of water (18.0 ml) having been separated off. Working up takes place analogously to Example A and 262 g (92.5 percent of theory) of the desired clear, viscous diester, containing less than 0.017 free carboxyl equivalent/kg, are obtained.

The proton-magnetic resonance spectrum, and also the microanalysis shown below, are in agreement with the structure given below:

Found: 59.5% C 8.2% H 22.6% O 9.7% N
Calculated 59.4% C 8.2% H 22.6% O 9.9% N

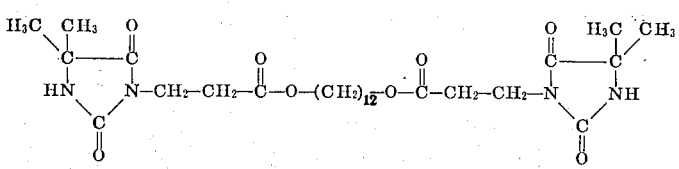

Example D: Diester of 1 mol of hydrogenated bisphenol A and 2 mols of 3-(2'-carboxyethyl)-5,5-dimethylhydantoin.

0.6 mol of 3-(2'-carboxyethyl)-5,5-dimethylhydantoin (120.1 g) are reacted with 0.3 mol (72.0 g) of hydrogenated bisphenol A (4,4'-dihydroxydicyclohexylpropane) in 300 ml of toluene and in the presence of 4 g of p-toluenesulphonic acid, analogously to Example A.

The reaction is complete in 16 hours at 168° – 170° C bath temperature (internal temperature 110° – 113° C); 9.0 ml of water have been separated off.

Working up takes place as explained in more detail in Example A. 158 g (87.2 percent of theory) of a crystalline, yellowish powder are obtained which contains less than 0.031 free carboxyl equivalent/kg. It melts between 170° and 190° C. The product obtained agrees with the following structure:

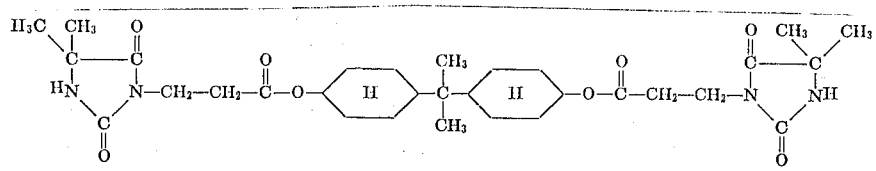

Example E: Diester of 1 mol of polyethylene glycol (200) and 2 mols of 3-(2'-carboxyethyl)-5,5-dimethylhydantoin.

Following Example A, 200.2 g of 3-(2'-carboxyethyl)-5,5-dimethylhydantoin (1.0 mol) are esterified with 100 g of polyethylene glycol 200 (0.5 mol) in 500 ml of chloroform, with the addition of 5 g of p-toluenesulphonic acid. At a bath temperature of 130° C (reaction temperature 65° C) the reaction is complete in 48 hours; 16 ml of water are separated off (theory = 18 ml). Working up takes place analogously to Example A.

243 g (86 percent of theory) of a clear, light brown, viscous resin are obtained, wherein the content of free acid equivalents is less than 0.042 equivalent/kg. The product obtained accords with the following structure:

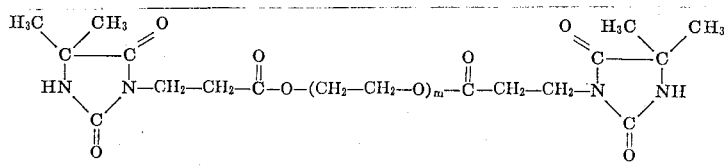

m~4.1

Example F: Diester of 1 mol of polypropylene glycol 425 and 2 mols of 3-(2'-carboxyethyl)-5,5-dimethylhydantoin.

Analogously to Example A, 800.8 g of 3-(2'-carboxyethyl)-5,5-dimethylhydantoin (4.0 mols) are esterified with 850 g of polypropylene glycol 425 (2.0 mols) in 2,000 ml of chloroform, with the addition of 12 g of p-toluenesulphonic acid. The esterification requires 96 hours at 130° C bath temperature (reaction temperature 66°–67° C); during this time, 69.3 ml of water are distilled off (96.3 percent of theory).

Working up takes place analogously to Example A. 1,518.7 g of a viscous light brown resin (95 percent of theory) are obtained, wherein the content of free acid equivalents is less than 0.037 equivalents/kg.

Example G: Triester of 1 mol of 1,1,1-trimethylolpropane and 3 mols of 3-(2'-carboxyethyl)-5,5-dimethylhydantoin 120.1 g of 3-(2'-carboxyethyl)-5,5-dimethylhydantoin (0.6 mol) are esterified with 26.8 g of 1,1,1-trimethylolpropane (0.2 mol) in 200 ml of chloroform, with the addition of 2.0 g of p-toluenesulphonic acid, in accordance with Example A. After 23 hours at a bath temperataure of 120° C (reaction temperature 67° C) the reaction is complete. 10 ml of water (theory 10.8 ml) are separated off.

After working up according to Example A, 101 g of a brown, clear resin are obtained. The product essentially accords with the following structure:

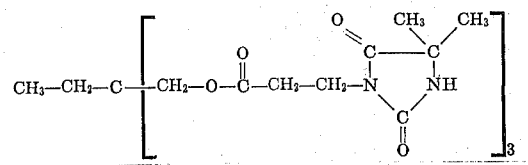

Example H: Diester of 1 mol of 1,6-hexanediol and 2 mols of 3-(2'-carboxyethyl)-5-methyl-5-ethylhydantoin Analogously to Example A, 107.1 g of 3-(2'-carboxyethyl)-5-methyl-5-ethylhydantoin (0.5 mol) are esterified with 29.5 g of 1,6-hexanediol (0.25 mol) in 200 ml of chloroform, with the addition of 3 g of p-toluenesulphonic acid. The reaction is complete after 16 hours at 120° C bath temperature (internal temperature 60°–67° C). Working up takes place analogously to Example A.

117.6 g (92.2 percent of theory) of a brown, clear, viscous resin are obtained, wherein the content of free acid equivalents is less than 0.01 equivalent/kg.

Elementary analysis shows the following:

| Found: | 56.1 % C | 7.7% H | 10.6 % N |
|---|---|---|---|
| Calculated: | 56.45% C | 7.5% H | 10.97% N |

The product obtained accords with the following structure:

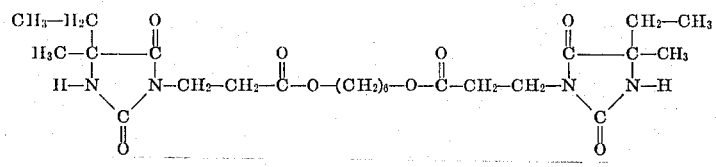

Example J: Diester of 1 mol of 1,4-butanediol and 2 mols of 3-(2'-methyl-2'-carboxyethyl)-5,5-dimethylhydantoin 85.6 g of 3-(2'-carboxyethyl)-5,5-dimethylhydantoin (0.4 mol) are esterified with 18.0 g of 1,4-butanediol (0.2 mol) in 200 ml of chloroform, with the addition of 3 g of p-toluenesulphonic acid, in accordance with Example A. At a bath temperature of 110°C (reaction temperature 65°C) the reaction is complete after 23 hours; 6.7 ml of water are separated off (theory: 7.2 ml).

After working up according to Example A, 85.9 g (89.0 percent of theory) of a light brown, viscous resin are obtained, wherein the content of free acid equivalents is less than 0.08 equivalent/kg. The results of the microanalysis given below with the structure shown below.

| Found: | 54.5 % C | 7.4 % H | 11.3 % N |
|---|---|---|---|
| Calculated: | 54.76% C | 7.10% H | 11.61% N |

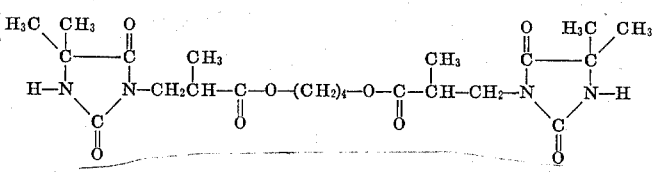

B. MANUFACTURING EXAMPLES

Example 1

90.9 g of the new diester from 1 mol of 1,4-butanediol and 2 mols of 3-(2'-carboxyethyl)-5,5-dimethylhydantoin, manufactured according to Example A, are heated with 555 g of epichlorohydrin and 0.5 g of tetraethylammonium chloride to 117°–119° C (reflux temperature) for 120 minutes, whilst stirring. A sample withdrawn from the batch and freed of epichlorohydrin, dichlorohydrin and the like, shows an expoxide content of 1.39 equivalents/kg. An azeotropic circulatory distillation is then set up by applying a vacuum at 150°–160° C bath temperature, in such a way that a temperature of the reaction mixture of 58°–61° C results. 35.2 g of 50 percent strength sodium hydroxide solution are then added dropwise over the course of 180 minutes with vigorous stirring, and the water which separates continuously is removed. Thereafter, distillation is continued for a further 30 minutes under the indicated conditions in order to complete the reaction. The mixture is then cooled to room temperature, the sodium chloride produced in the reaction is removed by filtration and the mixture is extracted by shaking with 100 ml of water in order to remove the last traces of sodium chloride and sodium hydroxide. The organic phase is separated off and concentrated to dryness on a rotary evaporator at 60° C under a waterpump vacuum, and the residue is treated at 90° C under 0.2 mm Hg until it reaches constant weight.

92 g (81.2 percent of theory) of a clear, yellowish, viscous epoxide resin of epoxide content 3.35 equivalent/kg (corresponding to 95 percent of theory) are obtained. The total chlorine content is 0.7 percent. The new epoxide resin corresponds to the following structure:

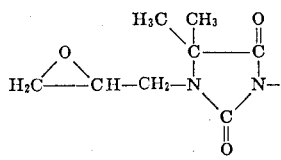 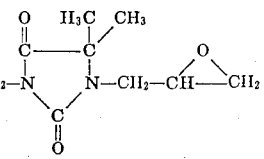

Example 2

Analogously to Example 1, a mixture of 241.2 g (0.5 mol) of a diester manufactured according to Example B from 1 mol of 1,6-hexanediol and 2 mols of 3-(2'-carboxyethyl)-5,5-dimethylhydantoin, 925 g of epichlorohydrin (10 mols) and 2.0 g of tetramethylammonium chloride are stirred for 120 minutes at 114°C to 119°C. The dehydrohalogenation is then carried out analogously to Example 1 with 88.0 g of 50 percent strength sodium hydroxide solution at 60° C over the course of 140 minutes, and the mixture is subsequently distilled for a further 30 minutes. The working up and purification of the resin are carried out as described in Example 1.

276.4 g of a clear, highly viscous brownish resin of epoxide content 3.21 equivalents/kg (95.4 percent) are obtained. The total chlorine content is 0.8 percent. The new epoxide resin corresponds to the following structure:

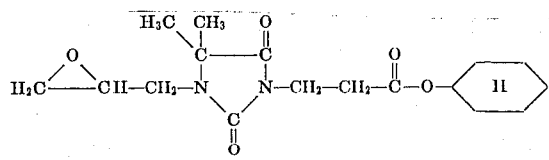

Example 3

226.7 g (0.4 mol) of the diester from 1 mol of 1,12-dodecanediol and 2 mols of 3-(2'-carboxyethyl)-5,5-dimethylhydantoin manufactured according to Example C, 740 g of epichlorohydrin and 2.0 g of tetramethylammonium chloride are reacted analogously to Example 1. The dehydrohalogenation is carried out as described in Example 1, with 70.4 g of 50 percent strength sodium hydroxide solution (0.88 mol). The working up again takes place analogously to Example 1.

249.8 g of a clear, light yellow, viscous resin (92 percent of theory) are obtained. The epoxide content is 2.88 equivalents/kg (97.6 percent of theory). The total chlorine content is 0.75 percent. The new epoxide resin corresponds to the following structure:

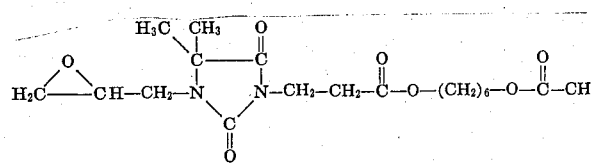

Example 4

A mixture of 120.8 g (0.2 mol) of the diester manufactured according to Example D from 1 mol of hydrogenated bisphenol A and 2 mols of 3-(2'carboxyethyl)-5,5-dimethylhydantoin, 555 g of epichlorohydrin and 0.5 g of tetramethylammonium chloride is reacted analogously to Example 1. The dehydrohalogenation is carried out analogously to Example 1, with 35.2 g of 50 percent strength aqueous sodium hydroxide solution (0.44 mol). Working up according to Example 1 yields 123.4 g of a clear, reddish-brown, highly viscous epoxide resin (86.1 percent of theory), the epoxide content of which is 2.72 equivalents/kg (97.5 percent of theory). The new epoxide resin essentially corresponds to the following structure:

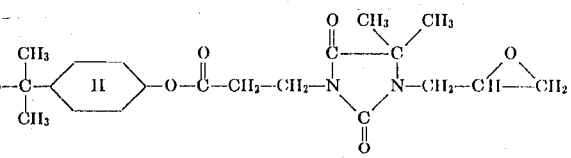

Example 5

112.9 g (0.2 mol) of the diester manufactured from 1 mol of polyethylene glycol (200) and 2 mols of 3-(2'-carboxyethyl)-5,5-dimethylhydantoin according to Example E, 555 g of epichlorohydrin and 0.5 g of tetramethylammonium chloride were reacted analogously to Example 1. The dehydrohalogenation is carried out in the same manner, with 35.2 g of 50 percent strength aqueous sodium hydroxide solution (0.44 mol). Equally, the product is worked up analogously to Example 1.

113.1 g (97.1 percent of theory) of a light brown, viscous epoxide resin are obtained, wherein the epoxide content is 2.96 equivalents/kg (corresponding to 100 percent of theory). The product obtained accords with the following structure:

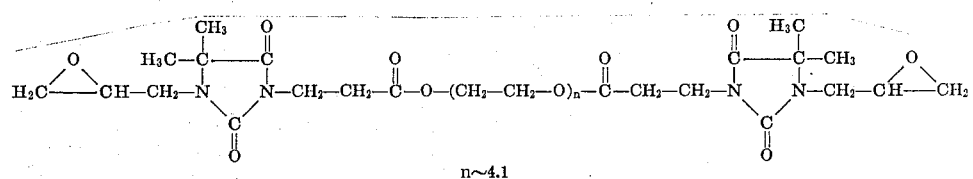

n~4.1

Example 6

790 g (1.0 mol) of the diester from 3-(2'-carboxyethyl)-5,5-dimethylhydantoin and polypropyl-

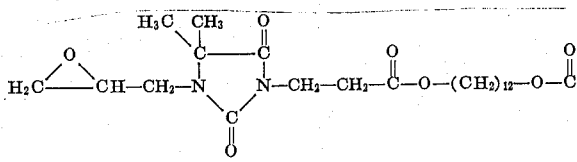 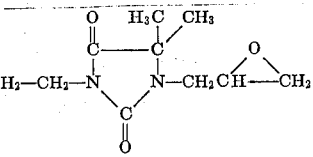

ene glycol 425 manufactured according to Example F are reacted with 2,770 g of epichlorohydrin (30 mols) and 3 g of tetraethylammonium chloride analogously to Example 1. The dehydrohalogenation is also carried out analogously to Example 1, with 176 g of 50 percent strength aqueous sodium hydroxide solution (2.2 mols). The mixture is worked up according to Example 1 and an epoxide resin of low viscosity is obtained in 96 percent yield (868 g). The epoxide content is equivalent/kg; epoxide equivalent/kg; the total chlorine content is 0.5 percent. The viscosity at 25° C is 1,900 cP (according to Hoppler). The colour number of the new diglycidyl compound is 8 (according to Gardner-Holdt).

Example 9

72.4 g (0.15 mol) of the diester from 1 mol of 1,4-butanediol and 2 mols of 3-(2'-methyl-2'-carboxyethyl)-5,5-dimethylhydantoin, manufactured according to Example J, 208 g of epichlorohydrin and 0.5 g of tetramethylammonium chloride are reacted analogously to Example 1. The dehydrohalogenation is carried out as described in Example 1, with 26.4 g of 50 percent strength sodium hydroxide solution (0.33 mol). Working up according to Example 1 yields 85.2 g of a brown, viscous epoxide resin (95.5 percent of theory), wherein the epoxide content is 3.35 equivalents/kg (99.7 percent of theory). The new epoxide essentially corresponds to the following structure:

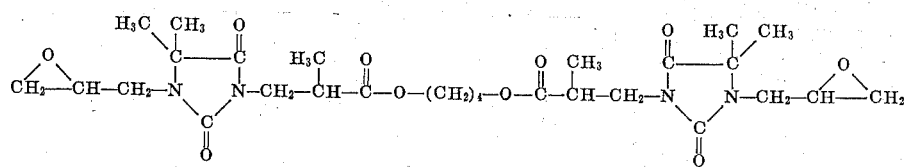

Example 7

88.4 g (0.13 mol) of the triester from 1 mol of 1,1,1-trimethylolpropane and 3 mols of 3-(2'-carboxyethyl)-5,5-dimethylhydantoin, manufactured according to Example G, 361 g (3.9 mols) of epichlorohydrin and 0.5 g of tetramethylammonium chloride were reacted analogously to Example 1. Dehydrohalogenation was carried out analogously with 34.3 g of 50 percent strength aqueous sodium hydroxide solution (0.429 mol). working up took place analogously to Example 1.

71 g of a yellow, highly viscous resin are obtained, wherein the epoxide content is 2.81 equivalents/kg (80.5 percent of theory). The total chlorine content is 0.9 percent. The new epoxide resin essentially corresponds to the following structure:

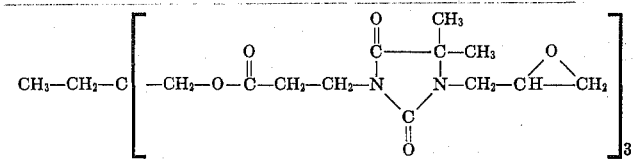

Example 8

76.5 g (0.15 mol) of the diester manufactured from 1 mol of 1,6-hexanediol and 2 mols of 3-(2'-carboxyethyl)-5-methyl-5-ethylhydantoin according to Example H, 208 g of epichlorohydrin and 0.5 g of tetramethylammonium chloride are reacted analogously to Example 1. The dehydrohalogenation is carried out with 26.4 g of 50 percent strength sodium hydroxide solution (0.33 mol) as described in Example 1. Working up according to Example 1 yields 87.5 g of a brown, viscous epoxide resin (93.7 percent of theory). The epoxide content is 2.08 epoxide equivalents/kg; the total chlorine content is 1.4 percent. The new epoxy resin essentially corresponds to the following structure:

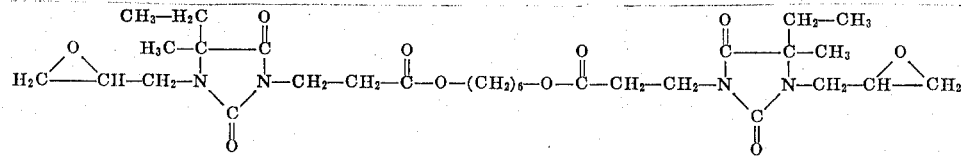

C. USE EXAMPLES

Example I 100 g of the diepoxide with 3.35 epoxide equivalents/kg manufactured according to Example 1 are mixed with 49 g of hexahydrophthalic anhydride and converted into a clear, homogeneous melt at 80° C. This melt is poured into aluminium moulds prewarmed to 120° C and is cured in 2 hours at 120° C and 20 hours at 150° C. The mouldings thus obtained show the following mechanical properties:

| | |
|---|---|
| Flexural strength (VSM 77,103) | = 10–13 kp/mm² |
| Deflection (VSM 77,103) | = 7–8.5 mm |
| Impact strength (VSM 77,105) | = 6–10 cmkp/cm² |
| Heat distortion point according to Martens (DIN 53,458) | = 61°C |
| Water absorption (4 days/20°C) | = 0.65% |

Example II

Analogously to Example I, 100 g of the new diepoxide, containing 3.21 epoxide equivalents/kg, manufactured according to Example 2 are mixed with 47 g of hexahydrophthalic anhydride and cured to give mouldings having the following properties:

| | |
|---|---|
| Flexural strength (VSM 77,103) | = 11.73 kp/mm² |
| Deflection (VSM 77,103) | = 15.5 mm |
| Impact strength (VSM 77,105) | = 7.6–10.0 cmkp/cm² |
| Heat distortion point according to Martens (DIN 53,458) | = 61°C |
| Water absorption (4 days/20°C) | = 0.62% |

Example III

Analogously to Example I, 100 g of the diepoxide containing 2.88 epoxide equivalents/kg, manufactured according to Example 3, are mixed with 37.7 g of hexahydrophthalic anhydride, and this mixture is converted, by curing for 2 hours at 120° C and 16 hours at 150° C, into mouldings having the following properties:

Flexural strength (VSM 77,103) = 8.41 kp/mm² ⎫ (no fracture
Deflection (VSM 77,103) = 20 mm ⎬ at maximum
Impact strength (VSM 77,105) = 10–13 cmkp/cm² ⎭ deflection)
Water absorption (4 days/20°C) = 0.54 %

Example IV

Analogously to Example I, 100 g of the new diepoxide, containing 2.72 epoxide equivalents/kg, manufactured according to Example 4, are mixed with 35.6 g of hexahydrophthalic anhydride and converted, using the temperature programme indicated in Example III, into castings having the following properties:

| | |
|---|---|
| Flexural strength (VSM 77,103) | = 13–14 kp/mm² |
| Deflection (VSM 77,103) | = 6–11 mm |
| Impact strength (VSM 77,105) | = 8–11 cmkp/cm² |
| Heat distortion point according to Martens DIN 53,458 | = 92°C |
| Water absorption (4 days/20°C) | = 0.44% |

Example V

Analogously to the description in Example I, 100 g of the epoxide resin, containing 2.97 epoxide equivalents/kg, manufactured according to Example 5 are converted with 43.3 g of hexahydrophthalic anhydride into mouldings having the following properties:

Flexural strength (VSM 77,103) = 7.2 kp/mm² ⎫ no fracture
Deflection (VSM 77,103) = 20 mm ⎬ at maximum
Impact strength (VSM 77,105) = 32.08 cmkp/cm² ⎭ deflection

Example VI 100 g of the epoxide resin with 2.04 epoxide equivalents/kg manufactured according to Example 6 are converted with 35.1 g of hexahydrophthalic anhydride analogously to Example I and cured in 5 hours at 120°C and 20 hours at 150°C. A flexible moulding having the following properties is obtained:

| | | |
|---|---|---|
| Elongation at break (VSM 77,101) | = | 102.3% |
| Water absorption (4 days/20°C) | = | 1.85% |

Example VII 100 g of the epoxide resin with 2.04 epoxide equivalents/kg, manufactured according to Example 6, are well mixed with 32 g of hexahydrophthalic anhydride and 1 g of the curing accelerator benzyldimethylamine at 80°C and the mixture is poured into an aluminium mould prewarmed to 80°C. The epoxide resin mixture is cured for 4 hours at 80°C and 12 hours at 140°C. The castings have the following mechanical properties.

| | | |
|---|---|---|
| Tensile strength (VSM 77,101) | = | 0.1 kp/mm² |
| Elongation at break (VSM 77,101) | = | 125% |
| Water absorption (4 days/20°C) | = | 2.0% |

Example VIII 100 g of the epoxide resin with 2.88 epoxide equivalents/kg manufactured according to Example 3 are well mixed with 4.4 g of hexahydrophthalic anhydride and 1 g of the curing accelerator benzyldimethylamine at 80°C and the mixture is poured into an aluminium mould prewarmed to 80° C. The epoxide resin mixture is cured for 4 hours at 80° C and 12 hours at 140° C. The castings have the following mechanical properties:

| | | |
|---|---|---|
| Flexural strength (VSM 77,103) | = | 8–11 kp/mm² |
| Deflection (VSM 77,103) | = | 20 mm |
| Impact strength (VSM 77,105) | = | 20–50 cmkp/cm₂ |
| Heat distortion point according to Martens (DIN 53,458) | | 40°C |
| Water absorption (4 days/20°C) | | 0.5–0.7 % |

Example IX 100 g of the epoxide resin with 3.21 epoxide equivalents/kg, manufactured according to Example 2, are well mixed with 48 g of hexahydrophthalic anhydride and 1 g of the curing accelerator benzyldimethylamine at 80° C and poured into an aluminium mould prewarmed to 80° C. Curing took place for 4 hours at 80° C and 12 hours at 140° C. The castings have the following mechanical properties:

| | |
|---|---|
| Flexural strength (VSM 77,103) | 10–14 kp/mm² |
| Deflection (VSM 77,103) | 15–20 mm |
| Impact strength (VSM 77,105) | 15–25 cmkp/cm² |
| Heat distortion point according to Martens (DIN 53,458) | 50–60 °C |
| Water absorption (4 days/20°C) | 0.5–0.7% |

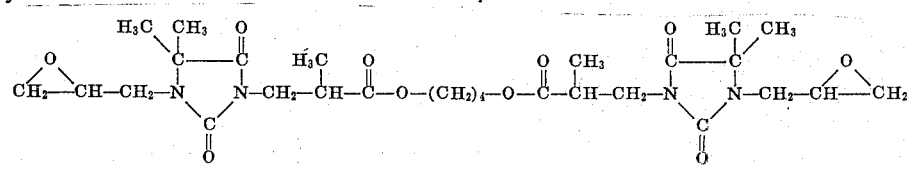

We claim:

1. A polyglycidyl compound having the formula

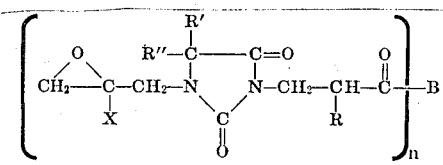

wherein X is hydrogen or methyl, n is 2 or 3, R is hydrogen or methyl, R' and R'' each is hydrogen or lower alkyl of one to four carbon atoms or wherein R' and R'' together are tetramethylene or pentamethylene; B when n is 2 is —O-alkylene-O— of two to 12 carbon atoms,

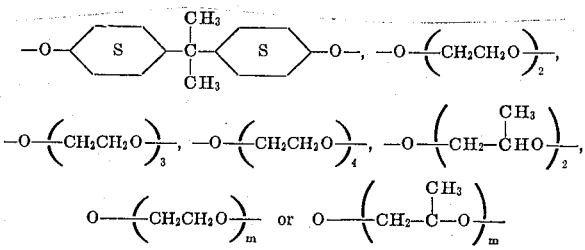

wherein m is an integer corresponding to an average molecular weight of 250 to 2,500 for the groups and B when n is 3 is $CH_3CH_2C(CH_2O-)_3$.

2. A compound as claimed in claim 1 of the formula

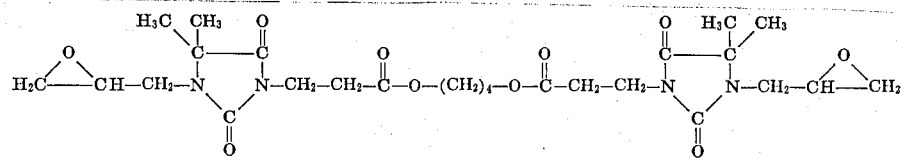

3. A compound as claimed in claim 1 of the formula

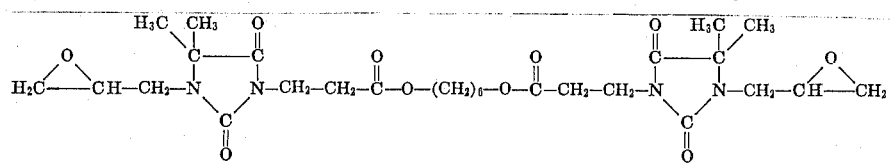

4. A compound as claimed in claim 1 of the formula

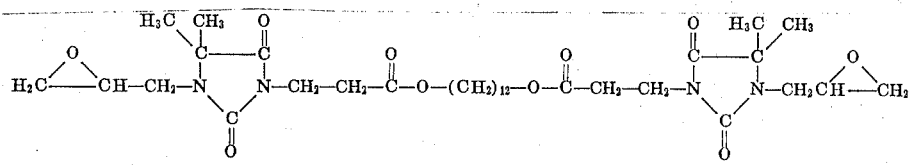

5. A compound as claimed in claim 1 of the formula

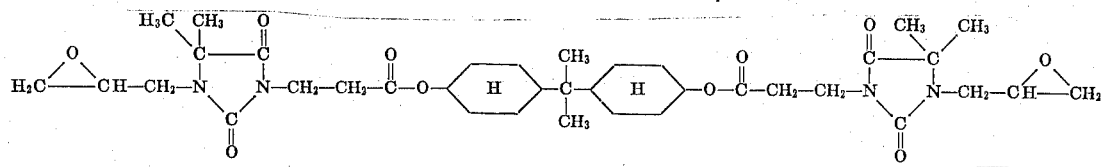

6. A compound as claimed in claim 1 of the formula

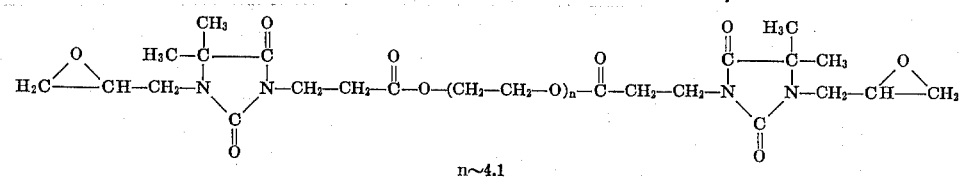

wherein $n$ is approximately 4.1.

7. A compound as claimed in claim 1 of the formula

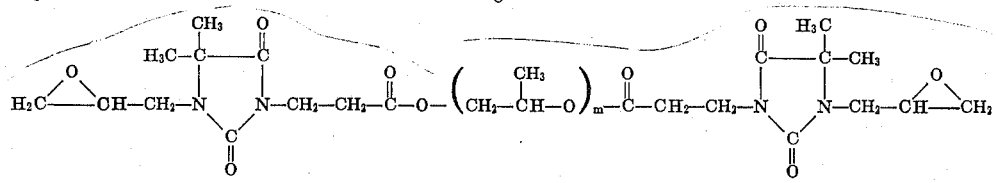

wherein $m$ is an integer corresponding to an average molecular weight of 425 for the group.

8. A compound as claimed in claim 1 of the formula

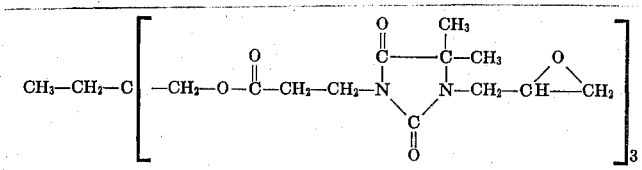

9. A compound as claimed in claim 1 of the formula

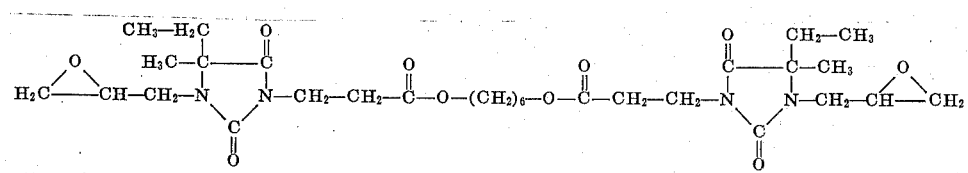

10. A compound as claimed in claim 1 of the formula